United States Patent
Prasse et al.

[15] 3,690,686
[45] Sept. 12, 1972

[54] PISTON WITH SEAL HAVING HIGH STRENGTH MOLYBDENUM ALLOY FACING

[72] Inventors: Herbert F. Prasse, Town and Country; Harold E. McCormick, Ballwin, both of Mo.

[73] Assignee: Ramsey Corporation, St. Louis, Mo.

[22] Filed: Aug. 11, 1969

[21] Appl. No.: 849,018

[52] U.S. Cl..................277/235 A, 29/191.2, 29/198
[51] Int. Cl..............................B23p 3/24, F02f 5/00
[58] Field of Search.....29/198, 156.63; 117/93.1 PF, 117/105; 75/176; 277/235 R, 235 A, 234, DIG. 6, 81 P

[56] References Cited

UNITED STATES PATENTS

| | | | |
|---|---|---|---|
| 3,378,392 | 4/1968 | Longo | 117/105 |
| 3,428,442 | 2/1969 | Yurasko, Jr. | 117/105.2 |

FOREIGN PATENTS OR APPLICATIONS

| | | | |
|---|---|---|---|
| 867,455 | 5/1961 | Great Britain | 117/105 |
| 930,089 | 7/1963 | Great Britain | 277/235 A |
| 1,039,809 | 8/1966 | Great Britain | 117/93.1 PF |

*Primary Examiner*—Winston A. Douglas
*Assistant Examiner*—M. J. Andrews
*Attorney*—Hill, Sherman, Meroni, Gross & Simpson

[57] ABSTRACT

Piston rings, including compression and oil control rings, for internal combustion engine pistons, having a bearing face of an alloy formed in situ on the ring from a plasma jet stream. The alloy is a high strength molybdenum alloy composed of molybdenum and a metal such as nickel, chromium, boron, and silicon. The coating has exceptionally high bond strength and possesses a higher tensile strength than present in heretofore used piston ring facings comprising molybdenum as the facing material. The piston rings are particularly useful in operation of heavy duty engines.

7 Claims, 6 Drawing Figures

Patented Sept. 12, 1972
3,690,686
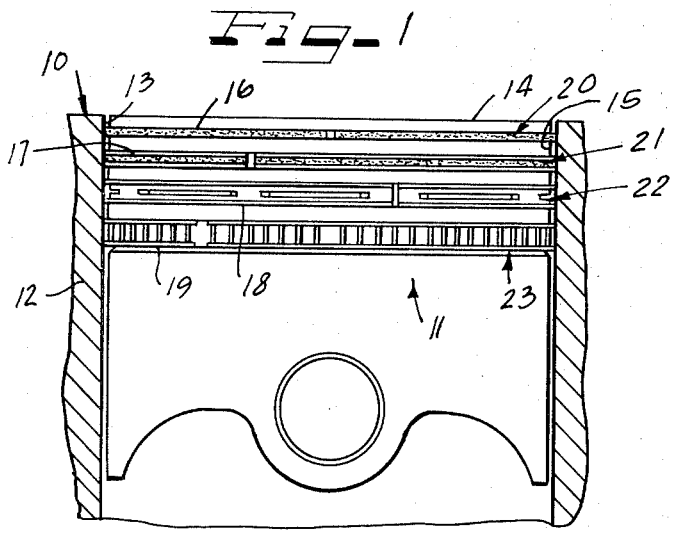
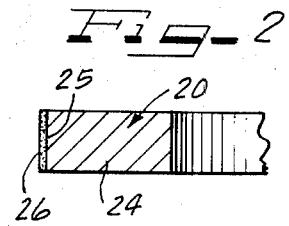
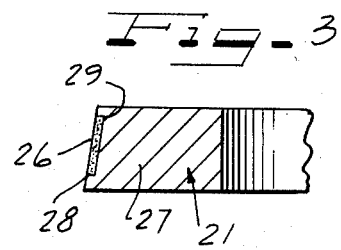
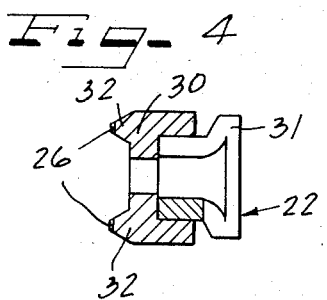
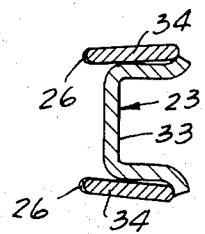
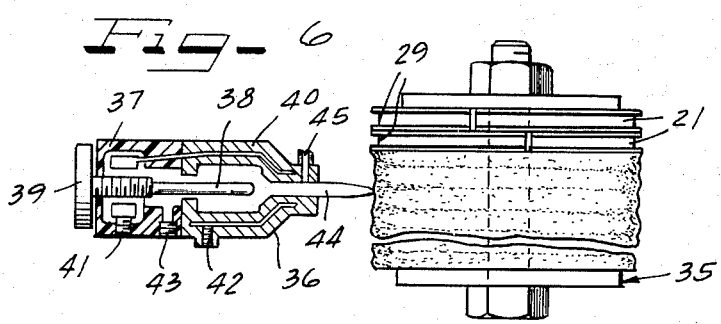
INVENTORS
HERBERT F. PRASSE
HAROLD E. McCORMICK
BY
ATTORNEYS

PISTON WITH SEAL HAVING HIGH STRENGTH MOLYBDENUM ALLOY FACING

BACKGROUND OF THE INVENTION

1. Field of the Invention

This invention pertains to the packing ring or piston ring art and to the provision of bearing faces on piston rings. The invention particularly deals with plasma jet applied coatings on piston rings which exhibit exceptionally high tensile and bond strengths, and are particularly useful in heavy duty engines.

2. Description of the Prior Art

Piston rings, including compression rings and oil control rings, coated with hard facing metal with good scuff resisting properties are disclosed in the following U.S. Letters Patent:

Roy D. Anderson; 2,905,512; issued Sept. 22, 1959
Melvin W. Marien; 3,133,341; issued May 19, 1964
Melvin W. Marien; 3,133,739; issued May 19, 1964
Donald J. Mayhew, et al.; 3,281,156; issued Oct. 25, 1966

While the flame spray applied molybdenum hard facing material disclosed in these patents affords the heretofore best known performance for piston rings in high-compression, high temperature operating internal combustion engines, engine builders continue to demand even greater perfection in piston ring performance. A molybdenum coating is particularly desirable in that it resists scuffing under adverse operating conditions. The molybdenum coating or facing, generally applied by the oxy-acetylene process also has additional desirable properties such as high melting point and high particle hardness. In addition the coating itself is porous which allows it to carry a lubricant on the surface of the coating, thus imparting good scuff resisting properties. Lastly, the molybdenum facing material has a surface oxidizing property which prevents surface welding under adverse operating conditions. That is, at high ring operating temperatures, say around 1,000°F., the surface layer oxidizes. The molybdenum oxides formed at the surface layers are soft and thus pass out of the engine rather than causing catastrophic failure, as is the case with chromium ring facings.

Molybdenum piston ring facings of the type described in the above patents however do have certain limitations. For example, the tensile strength is low in a relative strength. The best tensile strengths which can be obtained with prior art molybdenum coating are in the range of 5,500 to 8,000 psi. Yet, with high temperatures being experienced in the newer, heavy duty engines, extremely high thermal stresses may be encountered which cannot be resisted efficiently by the coatings. Again, the bond strength between molybdenum coatings and the basic ring material is not as high as is desirable, generally falling between 5,000 and 7,000 psi. Further, the coefficient of expansion of molybdenum coating is again low in the relative sense, being on the order of 3.03 in./in./F°.

Probably the area where molybdenum coatings are the least effective lies in the area of heavy duty engines where the ring wear is higher than desired when molybdenum coatings are employed. This is generally attributable to the relatively high porosity of the coating which tends to surface oxidize more rapidly than can be tolerated at the higher temperatures and firing pressures encountered in these heavy duty engines.

SUMMARY

The present invention provides hard-faced piston rings, giving particularly high performance under conditions of extremely high temperature and high pressure encountered in heavy duty engines, than heretofore known faced piston rings. The rings of this invention are coated with a plasma jet applied high strength molybdenum alloy formed in situ on the ring. The resultant alloy coating exhibits exceptionally high tensile strength and bond strength, has excellent hardness particularly in the secondary phase, and has a lesser porosity than unalloyed molybdenum coatings, overcoming the problems of such molybdenum piston ring facings, particularly those problems of wear in piston ring coating leading to failure in high heavy duty engines such as diesel engines. In addition, the molybdenum alloy coatings still exhibit the desirable properties of a conventional molybdenum coating such as excellent scuff resistance due to sufficient porosity to carry a lubricant, high particle hardness, ability to be finished by grinding on conventional silicon carbide and aluminum oxide grinding wheels, etc.

The molybdenum may be alloyed with a number of metals and metalloids including titanium, tantalum, columbium, vanadium, chromium, zirconium, hafnium, silicon, boron, aluminum, nickel, cobalt, etc. It is preferred that the molybdenum be alloyed with at least nickel, and more preferably that the molybdenum alloy comprise nickel and chromium as alloying elements. Most preferably the ingredients forming the alloy in addition to molybdenum include nickel, chromium, boron and silicon.

In accordance with the preferred embodiment of the invention, ferrous metal compression rings composed of conventionally cast nodular iron of about 3 ½ percent carbon content by weight, thin rail rings for oil control assemblies composed of carbon steel such as S.A.E. 1070, and the like base metal ring, are coated with a plasma jet stream, receiving a powder of 65–90 percent by weight of molybdenum and 10–35 percent by weight of at least one alloying element. A preferred powder has the following composition:

65–90 percent by weight molybdenum
7–25 percent by weight nickel
1–6 percent by weight chromium
0.3–1.5 percent by weight boron
0.2–1.5 percent silicon
Balance — iron with small amounts of carbon and cobalt.

The plasma jet is a fuel gas preferably composed of a mixture of nitrogen and hydrogen and an inert carrier gas, preferably argon or helium, which will prevent oxidation of the ingredients of the powder, even at the extremely high temperatures (up to 3,000°F.) that might be developed in the jet stream. The compression rings are preferably peripherally grooved and the groove is filled with an alloy resulting from the plasma jet application of the powder composed of the alloy ingredients of the invention. The powder is vaporized and deposited in the ring groove as an in situ formed high strength molybdenum alloy. After application of the molybdenum powder the groove of the piston ring is filled with the plasma jet applied molybdenum alloy efficiently bonded to the base metal.

The piston facing molybdenum alloyed material has exceptional tensile strength of at least 10,000 psi, and more often has a tensile strength of 11,000–14,000 psi. In addition it develops exceptional bond strength with the base material (in shear) of at least 10,000 psi, more often 10,000–12,000 psi. The alloyed molybdenum has a total porosity less than about 15 percent rendering it extremely useful in high B.M.E.P. engines for the reason that surface oxidation is more inhibited compared to oxidation of pure or unalloyed molybdenum coatings. The alloyed molybdenum coating itself is essentially a two-phase coating, having an outer hard phase of 900–1,000 Vickers DPN (diamond pyramid number) and a hardness secondary phase of 950–1,200 Vickers DPN, each measured with a 50 gram load.

It is therefore an object of this invention to provide improved piston rings with hard-faced bearing surfaces composed of a plasma jet applied high strength molybdenum alloy.

Another object of the invention is to provide piston rings for heavy duty engine operation having a plasma jet applied molybdenum alloy coating which exhibits exceptional tensile and bond strengths.

A further object of the invention is to increase the operating parameters of piston rings by providing plasma jet coatings of high strength molybdenum alloys thereon.

Still another object of the invention is to provide a high strength, hard wear resistant piston ring molybdenum alloy coating which may be processed using conventional silicon carbide or aluminum oxide grinding wheels.

A specific object of the invention is to provide an engine piston ring having an annular groove therearound filled with a layer of molybdenum alloy which is of sufficient porosity to allow it to carry a lubricant and yet not too porous whereby excessive surface oxidizing occurs at the relatively high temperatures and firing pressures encountered in heavy duty engines.

A still further object of the invention is to provide piston rings for heavy duty engine operation having a plasma jet applied high strength molybdenum alloy coating which, while still exhibiting the excellent properties of unalloyed molybdenum such as scuff resistance, also has excellent mechanical strength and shock resistance over a wide range of severe temperature conditions and additionally exhibits superior tensile and bond strengths.

Other objects, features and advantages of the invention will be readily apparent from the following description of certain preferred embodiments thereof, taken in conjunction with the accompaning drawings, all variations and modifications may be effected without departing from the spirit and scope of the novel concepts of the disclosure, and in which the following detailed description of the annexed sheet of drawings by way of preferred example illustrates several embodiments of the invention.

BRIEF DESCRIPTION OF THE DRAWINGS

FIG. 1 is a side elevational view, with parts in cross section, of an engine piston and cylinder assembly, wherein the piston has ring grooves equipped with compression and oil control rings each having a bearing face engaging the cylinder which is composed of in situ formed plasma jet applied carbide alloys, according to this invention.

FIG. 2 is an enlarged fragmentary cross-sectional view of the top compression ring in the piston on FIG. 1.

FIG. 3 is a view similar to FIG. 2, but illustrating the second compression ring in the piston of FIG. 1.

FIG. 4 is a view similar to FIG. 2, but illustrating the oil control ring in the third ring groove of the piston of FIG. 1.

FIG. 5 is a view similar to FIG. 2, but illustrating the oil control ring in the fourth ring groove of the piston of FIG. 1.

FIG. 6 is an elevational view of an arbor of piston rings being plasma jet coated in accordance with this invention.

DESCRIPTION OF THE PREFERRED EMBODIMENTS

The piston and cylinder assembly 10 of FIG. 1 illustrates generally a conventional four-ring groove internal combustion engine piston, operating in an engine cylinder. The assembly 10 includes a piston 11 and an engine cylinder 12 with a bore 13, receiving the piston 11. The piston 11 has a head 14 with a ring band 15 having four peripheral ring grooves 16, 17, 18 and 19 therearound. The top ring groove 16 has a split solid cast iron compression or fire piston ring 20 therein. The second ring groove 17 has a split solid second compression ring 21 somewhat wider than the ring 20. The third ring groove 18 carries a two-piece oil control ring assembly 22. The fourth or bottom ring groove 19 carries a three-piece oil control ring assembly 23.

As shown in FIG. 2, the top compression or fire ring 20 has a main body 24 composed of cast iron, preferably nodular gray iron, with a carbon content of about 3 ½ percent by weight. The outer periphery 25 of this ring is covered with a plasma jet applied molybdenum alloy coating 26.

As shown in FIG. 3, the second compression ring 21 has a main body 27 composed of the same type of cast iron as the body 24 of the ring 20. The outer periphery 28 of the body 27 is inclined upwardly and inwardly from the bottom edge of the ring, and a peripheral groove 29 is formed around this inclined periphery. The groove 29 is filled with the molybdenum alloy 26.

As shown in FIG. 4, the oil control ring assembly 22 in the third ring groove 18 is composed of a one-piece flexible channel ring 30 and a sheet-metal expander ring 31, having legs extending into the channel for expanding the ring 30. The ring 30 and the expander are more fully described in the aforesaid Mayhew et al. U.S. Pat. No. 3,281,156.

The one-piece control ring 30 has a pair of axially spaced, radially projecting beads 32. The peripheries of these beads 32 are coated with the coating 26.

In FIG. 5, the oil control ring assembly 23 includes a resilient spacer-expander ring 33 supporting and expanding split thin rail rings 34. The assembly 33 is of the type disclosed in the aforesaid Marien patents. The outer peripheries of the rail rings 34 are coated with the coating 26, according to this invention.

From the above description, it will be understood that the bearing faces of each of the compression and oil control rings 20, 21, 22 and 23 are coated with the molybdenum alloy according to this invention. These bearing faces 26 ride on and sealingly engage the bore 13 of the engine cylinder 12, and the rings are compressed in the bore 13, so as to expand tightly against the bore wall, and maintain a good sealing sliding engagement therewith.

As shown in FIG. 6, the coatings 26 are applied on the rings as for example on the grooved rings 21 by stacking a plurality of the rings on an arbor 35, with the rings compressed so that their split ends will be in abutment. The arbor clamping the stack of rings in their closed, contracted position may be mounted in a lathe and the peripheries of the rings machined to form the grooves 29 therearound. The outer peripheries of the rings 21 on the arbor are then coated with the coatings 26 from a plasma jet spray gun 36. The gun 36 includes an insulated casing such as Nylon 37, from which projects a rear electrode 38, the projection of which is adjustably controlled by a screw knob 39. The front face of the casing receives a front electrode 40. The casing 37 and electrode 40 are hollow and water-jacketed so that coolant may circulate therethrough from an inlet 41 to an outlet 42. Plasma jet gas is fed through an inlet 43 into the chamber provided by the casing 37 and the electrode 40 to flow around the electrode 38.

The front end of the electrode 40 provides a nozzle outlet 44 for the plasma flame and the ingredients to form the alloy of the coating 26 are fed to this nozzle through a powder inlet 45, just in advance of the discharge outlet of the nozzle.

A plasma composed of ionized gas is produced by passing the plasma gas from the inlet 43 through an electric arc established between the electrodes 38 and 40. This plasma gas is non-oxidizing and may be composed of nitrogen and hydrogen with argon, or helium as a carrier. The plasma flame exuding from the nozzle 44 draws the alloy-forming powder therewith by aspiration and subjects the powder ingredients to such high temperatures as to cause them to alloy. The jet stream carries the alloy into the bottom of the groove 29 of each piston ring and fills the groove.

A preferred powder fed to the powder inlet 44 of the gun 36 is composed of molybdenum, nickel, chromium, and boron in the proportions indicated hereinabove, with the most preferred powder mixture having the following range of elements:

65–90 percent by weight of molybdenum
7–24.5 percent by weight of nickel
1.6–5.8 percent of weight of chromium
0.4–1.3 percent by weight of boron
0.3–1.4 percent by weight of silicon
Balance — iron with small amounts of carbon and cobalt.

One specifically preferred powder mixture has the following composition:

75 percent by weight molybdenum
17.5 percent by weight nickel
4.12 percent by weight chromium
0.94 percent by weight boron
1.00 percent by weight silicon
Balance — iron with small amounts of carbon and cobalt.

Another preferred powder which may be fed to the powder inlet 44 of the gun 36 has the following range of elements:

65–90 percent by weight of molybdenum
3.5–12 percent by weight of nickel
3–10 percent by weight of chromium
1.5–5 percent by weight of tungsten
1–3 percent by weight of cobalt
0.8–3 percent by weight of iron
0.2–1 percent by weight of carbon
Balance — silicon and manganese.

One specific powder mixture falling within the above range has the following composition:

80 percent by weight molybdenum
7 percent by weight nickel
6 percent by weight chromium
3 percent by weight tungsten
2 percent by weight cobalt
0.8 percent by weight iron
0.4 percent by weight carbon
Balance — silicon and manganese.

A still further preferred powder mixture has the following range of elements:

65–90 percent by weight of molybdenum
6.5–25 percent by weight of nickel
1.3–7 percent by weight of chromium
0.3–1.7 percent by weight of silicon
0.2–1.7 percent by weight of boron
0.3–1.7 percent by weight of iron
0.1–0.4 percent by weight of cobalt
Balance — carbon and manganese.

A specific powder mixture falling within the just-enumerated range of elements has the following composition:

80 percent by weight molybdenum
14.6 percent by weight nickel
2.8 percent by weight chromium
0.8 percent by weight silicon
0.6 percent by weight boron
0.7 percent by weight iron
0.2 percent by weight cobalt
Balance — carbon and manganese.

After the coating is deposited it is bound to the base body of the ring of the piston. The fused-in alloy molybdenum forms in situ in the groove of the piston ring and is bonded to the body of the ring along a fused interface or welded zone. The interface or zone is composed of materials of the molybdenum alloy and the material of the ring body.

During the jet spray application it is desired to maintain a temperature in the groove of the piston ring such that excessive burning and melting away of the body metal is prevented. To achieve this end result, the arbor of the rings is preferably cooled with an external blast of inner gas impinging on both sides of the jet flame. It is desirable to keep the temperatures of the rings in the arbor around 400°F. or less. It is not necessary to provide any subsequent heat treatment for the plasma jet coated rings other than allowing the rings to air cool.

The powder fed to the inlet of the plasma jet spray gun is metered preferably with the aid of an aspirating gas, vibration, mechanical gearing, etc. All the powder is completely melted and penetrates into the center cone of the plasma jet flame.

The coatings 26 of this invention are less porous than the heretofore known flame sprayed molybdenum coatings. For example, where such flame sprayed molybdenum coatings normally have a porosity in the range of 20–30 percent, the coatings 26 only have a porosity of less than about 15 percent. This provides much greater corrosion resistance in the bearing face. In addition, as is noted above, in heavy duty engines high porosity coatings tend to surface oxidize more rapidly at higher temperatures and firing pressures encountered therein. This is obviated in the coatings here. Nevertheless, while the coatings have lesser porosity, they still have sufficient porosity to allow them to carry a lubricant in the surface for good scuff resistance properties. This, of course, is particularly important in the break-in period.

In a series of experimental runs, a molybdenum alloy coating of the invention was prepared and compared to an unalloyed molybdenum coating. The physical properties of the unalloyed versus the alloyed material are given in Table I below.

TABLE I

| Property | Unalloyed Moly | Alloyed Moly |
|---|---|---|
| Tensile Strength | 5,500–8,000 psi | 11,000–14,000 psi |
| Bond Strength (In shear) | 5,000–7,000 psi | 10,000–12,000 psi |
| Total Porosity | 20–30% | Less than 15% |
| Hardness-Vickers DPN 50 Moly Phase | 950–1,400 | 900–1,000 |
| Hardness Secondary Phase | None | 950–1,200 |

It is readily apparent that the alloyed molybdenum has materially greater tensile and bond strengths compared to the unalloyed molybdenum. In addition, the porosity of alloyed molybdenum is lower with the attendant benefits outlined above, particularly, when used as a coating of rings used in heavy duty diesel engines. The alloyed molybdenum also has an excellent hardness secondary phase, while the unalloyed molybdenum has no such desirable phase.

In another series of comparative tests, a piston ring having a plasma applied molybdenum alloy coating was used in a heavy duty or "high B.M.E.P. engine." The coating even after 1,000 hours of operation in such engines still exhibited low porosity and lack of distress. The above molybdenum coating was prepared from 75 percent by weight of molybdenum and 25 percent by weight of additional alloying elements including nickel, chromium, boron, and silicon along with minor amounts of iron, carbon and cobalt. In a like comparative test after similar operation in the high B.M.E.P. diesel engine, an unalloyed molybdenum piston ring facing showed loss of bond and high porosity.

By the term "B. M. E. P." as used above, is meant the "Brake Mean Effective Pressure". The *mean effective pressure* is the mean pressure acting on the top of the piston of an internal combustion engine during the length of the power stroke. The *brake* mean effective pressure is calculated from the measured brake horsepower an engine actually produces as follows:

$$BHP = (P_b LAN/33,000)$$

Where:
$BHP$ = Brake horsepower.
$P_b$ = Brake mean effective pressure in pounds per square inch.
$L$ = Length of the piston stroke in feet.
$A$ = Area of the piston head in inches.
$N$ = The number of power strokes per minute.
33,000 = Horsepower constant lbs/ft/min.

The Brake Mean Effective Pressure is always less than the indicated mean effective pressure by the average amount needed to overcome engine friction, windage, etc.

$$\text{Mechanical efficiency} = \frac{\text{Brake horsepower}}{\text{Indicated horsepower}}$$

Stated another way, Brake Horsepower equals Indicated Horsepower minus Friction Horsepower.

In diesel engine designs today there is a tendency toward higher and higher brake mean effective pressures. A 200 B.M.E.P. is being rapidly approached in production for over-the-highway, high speed, diesel truck engines. For some lower speed, military and locomotive engines even high pressures are being utilized, and in some instances experimental truck engines are being operated higher than 200 B.M.E.P. and at 2,450 psi peak firing pressure. This compares with about a 1,000 psi peak firing pressure for gasoline passenger car engines.

Engines operating at these high B.M.E.P. ranges, say 150–210 B.M.E.P. call for special piston ring coatings, and the alloyed molybdenum coatings of the invention here have particularly satisfied this need. As an example, a diesel engine which developed 165 B.M.E.P. and 237 horsepower at 1,700 rpm operated quite satisfactorily when the alloyed molybdenum coatings of the invention were used as piston ring facings. On the other hand, when chrome or unalloyed molybdenum were used the engine did not operate satisfactorily. In point of fact with the alloyed molybdenum coating of the invention this particular engine survived continuous testing for 980 hours at 2,450 psi firing pressure. To date this has not been accomplished with any other ring facing material.

From the above description it will therefore be understood that this invention now provides piston rings coated with molybdenum-type facings which will give better performance in engine operation than heretofore known, particularly in high B.M.E.P. engines.

We claim as our invention:

1. A piston ring having a bearing face coated with a plasma jet applied high strength alloy having the following percentages by weight:
    65–90 percent by weight of molybdenum
    3.5–12 percent by weight of nickel
    3–10 percent by weight of chromium
    1.5–5 percent by weight of tungsten
    1–3 percent by weight of cobalt
    0.8–3 percent by weight of iron
    0.2–1 percent by weight of carbon
    Balance — silicon and manganese.

2. A piston ring having a bearing face coated with a plasma jet applied high strength alloy having the following percentages by weight:
    65–90 percent by weight of molybdenum
    6.5–25 percent by weight of nickel
    1.3–7 percent by weight of chromium
    0.3–1.7 percent by weight of silicon
    0.2–1.7 percent by weight of boron
    0.3–1.7 percent by weight of iron
    0.1–0.4 percent by weight of cobalt
    Balance — carbon and manganese.

3. A piston ring having a bearing face of a high strength molybdenum alloy, said alloy having a tensile strength of at least 10,000 psi and a bond strength (in shear) of at least 10,000 psi wherein said alloy is formed in situ on said bearing face and wherein the ingredients forming said alloy consist essentially of the following in the specified percentages by weight:
- 65 – 90 percent molybdenum
- 7 – 25 percent nickel
- 1 – 6 percent chromium
- 0.3 – 1.5 percent boron
- 0.2 – 1.5 percent silicon.

4. The piston ring of claim 3, wherein
the molybdenum is present in the amount of 75 percent,
the nickel is present in the amount of 17.5 percent,
the chromium is present in the amount of 4.12 percent,
the boron is present in the amount of 0.95 percent,
and the silicon is present in the amount of 1.00 percent.

5. The piston ring of claim 3, wherein said bearing face has a porosity of less than about 15 percent but a sufficient porosity to carry a lubricant in the surface for good scuff resistance.

6. In combination with an internal combustion engine piston, a piston seal having a ferrous metal body and a high strength molybdenum alloy bonded thereto and providing the sealing face for the body, said alloy having a tensile strength of at least 10,000 psi and bond strength (in shear) of at least 10,000 psi, said alloy being formed in situ on said sealing face from ingredients consisting essentially of the following in the specified percentages by weight:
- 65 – 90 percent molybdenum
- 7 – 25 percent nickel
- 1 – 6 percent chromium
- 0.3 – 1.5 percent boron
- 0.2 – 1.5 percent silicon.

7. A piston ring having a bearing face of a high strength molybdenum alloy wherein said alloy is formed in situ on said bearing face and wherein the ingredients forming said alloy consist of the following in the specified percentages by weight:
- 65 – 90 percent molybdenum
- 7 – 25 percent nickel
- 1 – 6 percent chromium
- 0.3 – 1.5 percent boron
- 0.2 – 1.5 percent silicon
- any balance being from the group consisting of iron, cobalt, carbon and manganese.

* * * * *